United States Patent Office 2,889,712
Patented June 9, 1959

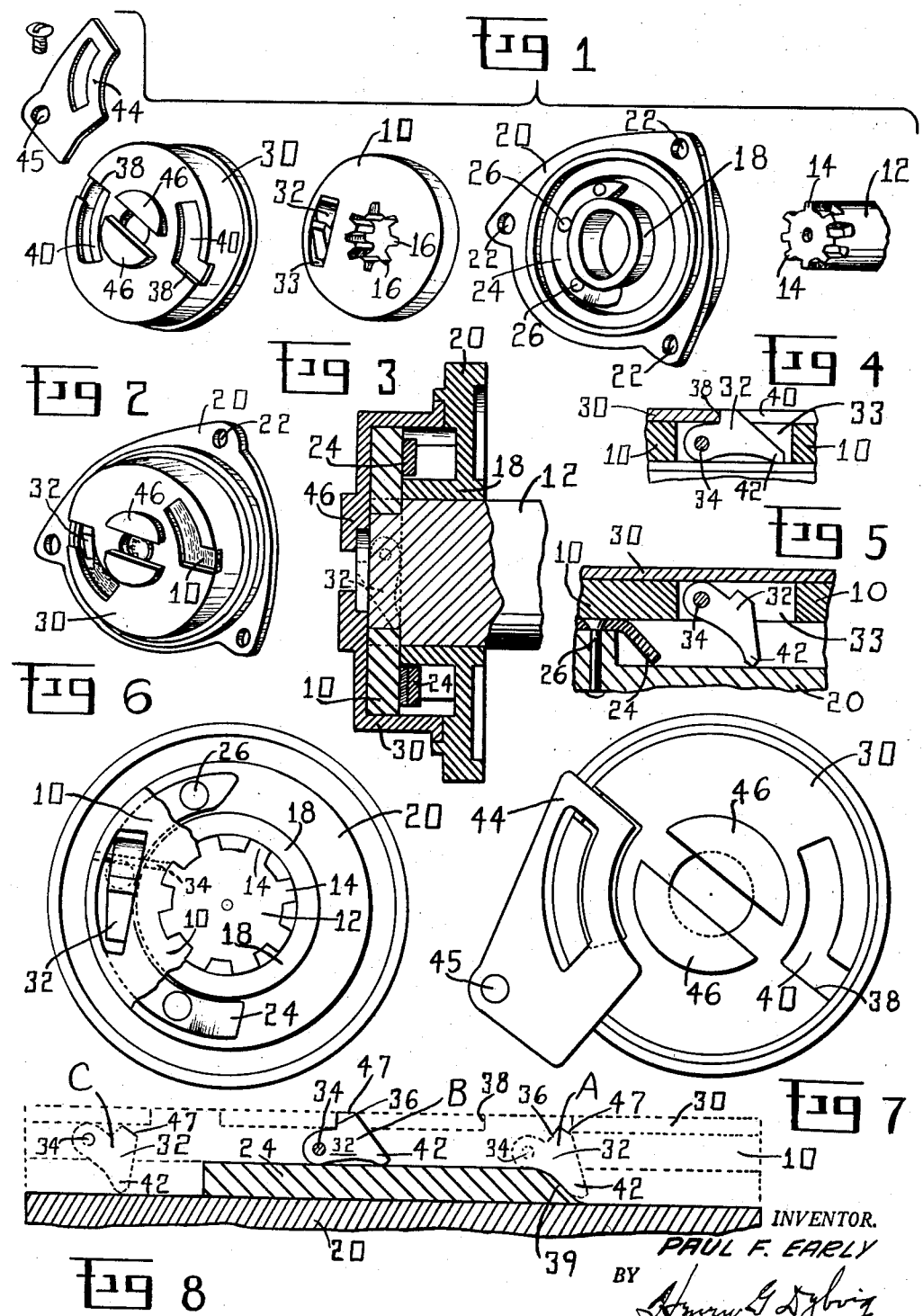

2,889,712

INTERMITTENTLY ENGAGING CLUTCH

Paul F. Early, Dayton, Ohio, assignor to Standard-Thomson Corporation, Dayton, Ohio, a corporation of Delaware Application January 26, 1953, Serial No. 333,282

9 Claims. (Cl. 74—125.5)

This invention relates to an intermittent driving mechanism. It relates to an intermittently engaging clutch and particularly to a one-half revolution clutch, but is not necessarily so limited.

Clutches of this type are used in applications in which it is desired to engage a driven member to rotate the driven member a portion of a revolution each time the driven member is actuated.

An object of this invention is to provide a clutch which will rotate a driven member precisely the same amount each time the driven member is actuated by the driving member.

Another object of this invention is to provide a clutch which will rotate the driven member precisely one-half revolution upon each engagement of the driven member by the driving member.

Another object is to provide an intermittent driving mechanism in which the driven member is locked in stationary position while it is disengaged from the driving member.

Other objects and advantages reside in the construction of parts, the combination thereof and the mode of operation, as will become more apparent from the following description.

In the drawings,

Figure 1 is an exploded view of the clutch showing the clutch members.

Figure 2 is a perspective view showing the driving member of the clutch and the driven member in their respective operating positions.

Figure 3 is a side sectional view showing the members of the clutch mechanism.

Figure 4 is a fragmentary sectional view showing the pawl of the driving member engaging a driving edge of the driven member.

Figure 5 is a fragmentary sectional view showing the pawl of the driving member in disengaged position from the driven member.

Figure 6 is an end view of a cam plate and a driving member with only a fragment of the driving member shown.

Figure 7 is an end view showing a driven member and a locking spring.

Figure 8 is a schematic view illustrating the operation of the pawl. This figure discloses the driving pawl as it appears in three positions during a complete revolution of the driving member.

Referring to the drawings in detail, a driving member 10 is connected to a drive shaft 12 by means of teeth 14 in the end of the drive shaft 12. The teeth 14 are adapted to fit snugly into radial slots 16 in the driving member 10. The shaft 12 is rotatably mounted in a bearing 18 in a base 20. The base 20 is mounted upon any suitable clutch support by means of screws or bolts inserted through apertures 22 in the base 20.

The driving member 10 slidably and rotatably engages a semicircular cam plate 24 which is mounted upon the base 20 by means of rivets 26. The heads of the rivets are countersunk into the cam plate 24. The semicircular cam plate 24 is concentric with the bearing 18.

A driven member 30, cup-like in shape, is rotatably mounted over the driving member 10. The diameter of the inner portion of the driven member 30 is slightly larger than the diameter of the driving member 10.

The driving member 10 is provided with a pawl 32 pivotally supported by a pintle 34 in an opening 33, as shown in Figures 1, 4 and 5. The pawl 32 is so spaced from the center of the driving member 10 that as the driving member 10 rotates, the pawl 32 will contact the cam plate 24. Thus, due to the fact that the cam plate 24 is semicircular in shape, as the driving member 10 is rotated by the drive shaft 12, the pawl 32 will ride upon the cam plate 24 only one-half of each revolution of the driving member 10.

The manner in which the pawl 32 is carried by the driving member 10 is best shown by the schematic view in Figure 8. The pawl 32 is provided with a shoulder 36 which is adapted to engage an edge 38 of either of the two arcuate slots 40 formed in the circular surface of the driven member 30. The edge 38 of each of the slots 40 forms an abutment surface for the shoulder 36 of the pawl 32 in each of the recesses formed by the slots 40. As the pawl 32 is carried in a circular path by the driving member 10, the pawl 32 first contacts the curved portion 39 of the cam plate 24, as shown at A in Figure 8. The pawl 32 is moved farther upon the cam plate 24 by rotation of the driving member 10 until the shoulder 36 is normal to the flat surface of the cam plate 24. After the pawl 32 has reached this position with the shoulder 36 of the pawl 32 normal to the flat surface of the cam plate 24, the shoulder 36 engages the edge 38 of one of the slots 40. As the shoulder 36 of the pawl 32 engages the edge 38 of one of the slots 40, the pawl 32 actuates rotation of the driven member 30, as shown at B in Figure 8.

The pawl 32 rotates the driven member 30 until a trailing end 42 of the pawl 32 falls from the flat surface of the cam plate 24, as best shown at C in Figure 8. So it may be understood that the pawl 32 drives the driven member 30 throughout the length of the cam plate 24. Thus, the driven member 30 is rotated one-half of a revolution each time it is engaged by the shoulder 36 of the pawl 32.

After the pawl 32 has dropped from the cam plate 24, as shown at C in Figure 8, rotation of the driving member 10 upon which the pawl 32 is pivotally mounted may be stopped or continued. Regardless of whether the rotation of the driving member 10 is continued or discontinued after the pawl 32 has dropped from the cam plate 24, as shown at C in Figure 8, the driven member 30 ceases to rotate precisely at the moment at which the end 42 of the pawl 32 drops from the cam plate 24.

A locking spring 44 attached to the clutch mounting by means of a suitable pin or bolt inserted through an aperture 45 is adapted to fit into one of the arcuate slots 40 of the driven member 30, as best shown by Figure 7. As the pawl 32 engages the curved portion 39 of the cam plate 24, an upper portion 47 of the pawl 32 engages the locking spring 44, lifting the locking spring 44 from the slot 40 as the shoulder 36 of the pawl 32 engages the edge 38 of the slot 40.

At the completion of a one-half revolution of the driven member 30, the pawl 32 is diametrically opposite the point at which it first engages the edge 38 of a slot 40 and the other slot 40 is so positioned as to allow the spring 44 to snap into position, locking the driven member 30 from further rotation. Thus, it may be understood that the pawl 32 always engages an edge 38 of the slot 40 which is retained by the locking spring 44. Furthermore, at the end of each one-half revolution of the driven member 30, the pawl 32 drops from the end of the cam plate 24 and is disengaged from the edge 38 of a slot 40 at the same instant that the locking spring 44 engages the other slot 40. The pawl 32, therefore, serves two purposes. First, the pawl 32 unlocks the driven member 30 by lifting the spring 44 from engagement within a slot 40. Then the pawl 32 engages an edge 38 of that slot 40 to rotate the driven member 30 as the pawl 32 engages the cam plate 24.

The driven member 30 is adapted to rotate any suitable device by means of bosses 46 spaced equidistant from the center of the driven member 30. The device engaged by the bosses 46 will, of course, be driven precisely one-half revolution each time the device is actuated.

The members of this clutch mechanism are so designed that the clutch will operate properly at any angle at which it is positioned. The driven member 30 need not be uppermost. In fact, it may be the lowest rotating member of the clutch. During rotation of the driven member 30 by the pawl 32, a force is exerted by the trailing end 42 of the pawl 32 upon the surface of the cam plate 24. After the pawl 32 has become disengaged from the surface of the cam plate 24, as shown at C in Figure 8, the pawl 32 must remain in the position as shown at C in Figure 8, regardless of the angle at which the clutch mechanism is mounted, until rotation of the driving member 10 brings the pawl 32 around to the curved portion 39 of the cam plate 24.

The arcuate cam plate as disclosed in the figures in the drawings extends exactly 180 degrees. Therefore, the driven member 30 always rotates precisely one-half of a revolution each time the driven member 30 is actuated. It may be understood that the cam plate 24 might be so constructed that it would extend for more or less than 180 degrees. This would provide means by which the driven member 30 would be actuated more or less than one-half of a revolution.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In an intermittent driving mechanism, the combination including a cam, a driving member supported adjacent the cam, a driven member provided with an abutment surface, and means for intermittently interconnecting the driving member to the driven member, said means including a pawl pivotally attached to the driving member and movable therewith and provided with a shoulder engageable with the abutment surface of the driven member, the pivotal axis of the pawl being normal to the direction of movement of the pawl, the pivotal axis of the pawl being located in advance of the abutment surface of the driven member during driving operation, said pawl being held in engagement with the driven member by the cam so that as the cam disengages the pawl the shoulder of the pawl retrocedes with respect to the abutment surface of the driven member.

2. In an intermittent driving mechanism, the combination including a cam having a main surface, a driving member supported adjacent the cam, a driven member provided with an abutment surface, a pivotal pawl member having a shoulder engaging the abutment surface of the driven member during the driving operation, said pawl member having a portion thereof engaging the main surface of the cam during the driving operation, and means attaching the pawl member to the driving member, said means being positioned so that the shoulder of the pawl member has retrogressive movement when the cam-engaging portion of the pawl member disengages the main surface of the cam.

3. A one-half revolution clutch comprising a base member including a semicircular cam plate, a driving member rotatably supported adjacent the cam plate, a pawl pivotally supported by the driving member and movable thereby, and a driven member rotatably movable adjacent the driving member, the driven member having a pair of abutment surfaces, the distance between the abutment surfaces being substantially equal to the length of the cam plate, the pawl being positioned intermediate the base and the driven member, the pivotal axis of the pawl being ahead of both abutment surfaces of the driven member and spaced from the driven member the pawl being pivotally moved into engagement with one of the abutment surfaces by engagement of the pawl with the cam plate, the driving member forcing the pawl to pivotally move from engagement with the cam plate as the pawl is carried by the driving member from the end of the cam plate.

4. An intermittent driving mechanism, the combination including an arcuate cam plate, the cam plate having a main surface, a driving member rotatably supported adjacent the cam plate, a driven member rotatably supported adjacent the driving member, the driving member and the driven member being concentric with the cam plate, and a pawl pivotally supported by the driving member and movable thereby, the pivotal axis of the pawl being substantially normal to the direction of movement thereof by the driving member, the pivotal axis of the pawl being at the forward end thereof and spaced from the driven member, the pawl being pivotally moved by the cam plate as the pawl is carried by the driving member, the driven member having a plurality of abutment surfaces, the pawl engaging an abutment surface of the driven member rotating the driven member during the portion of each revolution of the driving member in which the pawl rides upon the main surface of the cam plate.

5. A one-half revolution clutch comprising support structure, a drive shaft rotatably supported by the support structure, a semicircular cam plate attached to the support structure concentric with the drive shaft, a driving member rotatably carried by the drive shaft adjacent the cam plate, a pawl pivotally supported by the driving member, the pivotal axis of the pawl being substantially normal to the direction of movement thereof by the driving member, the pawl being positioned to contact the cam plate as the driving member rotates, a driven member adjacent the driving member and having a recess therein, the pawl pivoting out of engagement with the driven member as the pawl disengages the cam plate, the recess having an abutment edge, the pivotal axis of the pawl being ahead of the abutment edge of the recess of the driven member and spaced from the driven member, and a resilient locking member attached to the support structure and movable into the recess in the driven member locking the driven member against rotation, the cam plate causing pivotal operation of the pawl as the driving member rotates, the pawl operatively engaging the locking member moving the locking member out of the recess and unlocking the driven member, movement of the pawl into the recess also causing engagement of the pawl with the abutment edge of the recess rotating the driven member one-half of a revolution during each revolution of the driving member, the pawl thus serving a dual function as a means for unlocking the locking member and as a means for moving the driven member with the driving member.

6. In an intermittent driving mechanism, the combination including a cam plate, a driving member supported adjacent the cam plate, a pawl pivotally supported by the driving member and carried thereby, the pawl contacting the cam plate as the pawl is moved by the driving member, the pivotal axis of the pawl being substantially normal to the direction of movement thereof by the driving member, a driven member having an abutment surface, the pivotal axis of the pawl being ahead of said abutment surface, the pawl being forwardly moved by the driving member and pivotally moved by the cam plate so that the pawl is urged by the cam plate into engagement with the abutment surface of the driven member actuating the driven member, the pawl angularly moving from the cam plate as the pawl disengages from the cam plate as a result of the coaction between the said members so that the pawl pivotally moves from engagement with the abutment surface of the driven member to deactuate the driven member.

7. An intermittent driving mechanism including a stationary cam plate, the cam plate having a main surface and an inclined portion, a driving member movably supported adjacent the cam plate, a driven member movably supported adjacent the driving member, the driven member having a plurality of recesses, a resiliently operable locking member supported adjacent the driven member, the locking member being movable into any one of the recesses of the driven member for locking engagement therewith, each of the recesses being provided with an abutment surface, a pawl pivotally supported by the driving member and movable thereby, the pivotal axis of the pawl being substantially normal to the direction of movement thereof by the driving member, the pawl being engageable with the cam plate during movement thereof by the driving member, the pivotal axis of the pawl being at the forward end thereof and spaced from the driven member, the driven member being movable so that any of the recesses thereof is disposed adjacent the cam plate, the pawl being pivotally movable by the cam plate into any one of the recesses of the driven member which is in alignment with the inclined surface of the cam plate, the pawl being firmly held in engagement with an abutment surface of the recess during engagement of the pawl with the main surface of the cam plate, the coaction between said members in cooperation with the cam plate causing pivotal movement of the pawl into and out of engagement with the abutment surface of a recess during movement of the driving member.

8. An intermittent driving mechanism including an elongate cam, a driving member supported adjacent the cam, a driven member provided with an abutment surface, the driven member being driven in the same general direction as the driving member, means for interengaging the driving member with the driven member, said means including a pawl having a portion engaging the abutment surface and a portion engaging the cam during the driving operation, means movably attaching said pawl to one of said members so that the abutment surface travels through a rotary retrogressive path when the pawl is disengaged by the cam, and locking means engageable with the driven member adjacent the abutment surface locking the driven member against movement, said locking means being engageable by the pawl for unlocking thereof as the pawl engages the abutment surface for movement of the driven member.

9. An intermittent driving mechanism including an elongate cam, a driving member supported adjacent the cam, a driven member provided with an abutment surface, the driven member being movable in the same general direction as the driving member, means for interengaging the driving member with the driven member, said means including a pawl having an engagement portion engaging the abutment surface and a portion engaging the cam during the driving operation, and means movably attaching said pawl to one of said members, said means being so positioned that said engagement portion of the pawl travels through a rotary retrogressive path when disengagement occurs between the cam and the pawl.

References Cited in the file of this patent

UNITED STATES PATENTS

| | | |
|---|---|---|
| 843,020 | Jones | Feb. 5, 1907 |
| 1,834,209 | Harper | Dec. 1, 1931 |
| 2,368,892 | Skoog | Feb. 6, 1945 |
| 2,485,738 | Jeschke | Oct. 25, 1949 |

FOREIGN PATENTS

| | | |
|---|---|---|
| 144,953 | Austria | Mar. 25, 1936 |
| 683,055 | Germany | Oct. 28, 1939 |